(12) United States Patent
Cooper et al.

(10) Patent No.: US 11,475,139 B2
(45) Date of Patent: Oct. 18, 2022

(54) SYSTEM AND METHOD FOR PROVIDING SECURE DATA ACCESS

(71) Applicant: Barclays Execution Services Limited, London (GB)

(72) Inventors: John Cooper, London (GB); David Fulton, London (GB); Jeremy Goldstone, London (GB)

(73) Assignee: Barclays Execution Services Limited, London (GB)

( * ) Notice: Subject to any disclaimer, the term of this patent is extended or adjusted under 35 U.S.C. 154(b) by 0 days.

(21) Appl. No.: 16/830,735

(22) Filed: Mar. 26, 2020

(65) Prior Publication Data

US 2020/0311289 A1 Oct. 1, 2020

(30) Foreign Application Priority Data

Mar. 27, 2019 (EP) .................................. 19165609

(51) Int. Cl.
*G06F 21/60* (2013.01)
*G06F 21/33* (2013.01)
*G06F 21/34* (2013.01)

(52) U.S. Cl.
CPC ............ *G06F 21/602* (2013.01); *G06F 21/33* (2013.01); *G06F 21/34* (2013.01); *G06F 21/604* (2013.01)

(58) Field of Classification Search
CPC ........ G06F 21/602; G06F 21/33; G06F 21/34; G06F 21/604; G06F 21/31; G06F 21/44; G06Q 20/3821; H04L 63/0876; H04L 63/20

USPC ......................................................... 713/165
See application file for complete search history.

(56) References Cited

U.S. PATENT DOCUMENTS

| 2013/0340093 | A1  | 12/2013 | Reinertsen |
| 2015/0142670 | A1* | 5/2015  | Zloth ................. G06Q 20/3829 705/71 |
| 2016/0125402 | A1* | 5/2016  | Lee ....................... G06Q 20/367 705/67 |
| 2017/0280321 | A1* | 9/2017  | Caceres ................... G06F 21/34 |
| 2018/0109947 | A1* | 4/2018  | Kim ........................ G06F 21/34 |
| 2018/0183586 | A1* | 6/2018  | Bhargav-Spantzel ...................... G06F 21/33 |

OTHER PUBLICATIONS

Extended European Search Report dated Oct. 28, 2019 in connection with European Application No. 19165609.9.

(Continued)

*Primary Examiner* — Jacob Lipman
(74) *Attorney, Agent, or Firm* — Wilmer Cutler Pickering Hale and Dorr LLP

(57) ABSTRACT

A computer-implemented method for securing a user device is disclosed. A signed device authentication key is requested and received from a user application executing on the user device. The signed device authentication key is obtained via a software module installed on the user device and associated with a secure data processing provider. A device setup request is transmitted from the user device to the secure data processing system using the signed device authentication key. The device setup request comprises the signed device authentication key. The authenticity of the device setup request is verified at the secure data processing system based on the signed device authentication key.

16 Claims, 6 Drawing Sheets

(56) References Cited

OTHER PUBLICATIONS

Gopalan et al., "Policy driven Remote Attestation," Internet of Things, IoT Infrastructures, Jan. 1, 2012 (Jan. 1, 2012), Springer International Publishing, Cham, XP055846066, ISBN: 1867-8211, ISBN: 978-3-319-47075-7, vol. 94, pp. 148-159, DOI: 10.1007/978-3-642-30244-2_13. Retrieved from the Internet: (https://www.doc.ic.ac.uk/~axgopala/papers/mobisec11.pdf). 12 pages.

* cited by examiner

SYSTEM AND METHOD FOR PROVIDING SECURE DATA ACCESS

RELATED APPLICATIONS

Foreign priority benefits are claimed under 35 U.S.C. § 119 to European application number 19165609.9, filed Mar. 27, 2019, the entire contents of which is hereby incorporated herein by reference in its entirety.

TECHNICAL FIELD

This disclosure relates to a system, device, method and computer program for providing access to secure user data.

BACKGROUND

In digital communication systems, data can be transferred between devices at high speeds and in large volumes over public networks, such as the Internet. This is advantageous for distributing information widely, but comes with the drawback of potentially sensitive data being distributed to malicious or fraudulent entities that may compromise a user's security. Moreover, data is exchanged increasingly between user devices, such as smartphones and tablets, via software applications installed on such devices. Such software applications are downloaded and installed on the user devices, and are often provided by separate legitimate entities to the providers of a secure data service. It is important to be able to permit legitimate third party entities to be in a position to provide the software application which is installed on the user device, whilst at the same time permit legitimately installed software applications to access secure user data stored at the secure data provider in a secure manner. A further objective is to prevent malicious or fraudulent entities from accessing a user's secure private data and ensure that only legitimately installed software applications on the user's device can access such data.

SUMMARY

In one aspect of the invention, there is provided a computer-implemented method for securing a user device for receiving secure user data associated with a user of the user device from a secure data processing of a secure data processing provider, the method comprising:

a) requesting and receiving by a user application executing on the user device a signed device authentication key via a software module installed on the user device;

b) transmitting by the user application a device setup request from the user device to the secure data processing system, the device setup request comprising the signed device authentication key, wherein the software module is associated with the secure data processing provider and the signed device authentication key is generated uniquely for the user device upon request by the user application. The software module is installed on the user device. It may be a software module distinct from the user application, i.e. installed separately as a discrete module, or at a different time to the user application.

Accordingly, security for access to the secure data processing provider can be managed securely and independently from the user application.

The computer-implemented method may further include:

c) verifying the authenticity of the device setup request at the secure data processing system with the signed device authentication key;

d) only if the authenticity of the device setup request is verified according to step c), then associating the user device identified according to the device setup request with the secure user data stored at the secure data processing system.

Since the device setup request contains a signed device authentication key from the software module, a user device running the application can be securely linked to the data processing provider since it can be determined whether or not it is being setup by an user application utilising a valid secure data access procedure provided by the software module, which is associated with the secure data processing system.

Step b) may comprise:

b1) receiving at an intermediary processing system of an intermediary data provider, the device setup request; and b2) generating at the intermediary processing system an enhanced device setup request comprising the device setup request; and b3) transmitting the enhanced device setup request to the secure data processing system as the device setup request.

The intermediary processing system may be provided by an intermediary third party, separate to the secure data processing provider, and which may not be fully trusted to handle secure data access by the secure data processing provider.

Step a) may comprise:

a1) sending a device signing request to the software module;

a2) on receipt of the device signing request, securely authenticating the user of the user device with a secure user authentication process of the user device;

a3) only if the user of the device is positively authenticated, generating via the software module the signed device authentication key comprising a public key corresponding to a private key of the secure data processing system stored in a secure hardware module of the user device.

The computer-implemented method may further comprise:

e) generating in the user application a user setup request for the secure data processing provider;

f) transmitting the user setup request from the user device to the secure data processing provider along with the signed device authentication key for the user device;

g) verifying the authenticity of the user setup request at the secure data processing system; and h) only if the authenticity of the user setup request is verified at the secure data processing system, setting up a secure data storage profile for the user at the secure data provider and associating the secure data storage profile with the user device from which the signed device authentication key was received.

Step h) may further comprise one or more of:

h1) validating the user via a mobile verification code authentication process; and h2) validating a third party user account of the user via an account verification code (AVC) authentication process.

Step f) may further comprise:

f1) receiving the user setup request from the user device at an intermediary processing system of an intermediary data provider;

f2) generating at the intermediary processing system an enhanced user setup request comprising the user setup request;

f3) transmitting the enhanced user setup request from the intermediary processing system to the secure data processing system as the user setup request.

Step f2) may further comprise:

f2-1) generating signed intermediary credentials of the intermediary processing system; and f2-2) generating the enhanced user setup request comprising the user setup request received from the user device and signed intermediary credentials.

Step f2) may further comprise:

f2-3) generating the enhanced user setup request comprising the user setup request received from the user device and additional data stored at the intermediary processing system, wherein the additional data is associated with to the user and/or user device.

The signed device authentication key may be unique to the specific instance of the software module stored on the user device, or may be unique to the secure data processing provider (SDMS).

Step d) may further comprise:

d1) generating, at the secure data processing system, a device encryption key; and d2) transmitting the device encryption key to the user device and storing the device encryption key within the user device.

The device encryption key may be a public key for the device and is generated by the secure data processing system for storage in the device, wherein a corresponding private key to the public key is stored only in the secure data processing system and/or user device, for example in a secure storage module of the user device.

In a further aspect of the invention, there is provided a computer-implemented method for controlling access to data associated with a user securely to the user device of any one of the preceding claims, the data stored in the secure data processing system, the method comprising:

g) generating at the user device via the software application a signed secure data request for the data associated with the user;

h) transmitting the secure data request from the user device to the secure data processing system;

i) verifying the authenticity of the secure data request at the secure data processing system;

j) if the authenticity of the secure data request is verified according to step i):

j1) obtaining, at the secure data processing system, user data requested with the secure data request; and j2) transmitting the data to the user device; or k) if the authenticity of the secure data request is not verified according to step i) not transmitting to the user device any of the secure data requested with the secure data request.

The signed secure data request may comprise the signed device authentication key and step i) may comprise verifying at the secure data processing system the signed device authentication key comprised within the secure data request with a corresponding private authentication key of the software module associated with the user device and stored at the secure data processing system.

Alternatively, the secure data request may comprises a user identifier and step i) comprises identifying a private authentication key corresponding to the software module for the user device of the user identified by the user identifier, and verifying whether the private authentication key corresponds to the signed device authentication key comprised within the secure data request.

Step h) may comprises:

h1) transmitting the signed secure data request from the user device to an intermediary processing system;

h2) generating at the intermediary processing system an enhanced signed secure data request comprising the secure data request; and h3) transmitting the enhanced signed secure data request from the intermediary processing system to the secure data processing system as the secure data request.

Step h2) may comprise one or more of:

h2-1) applying to the signed secure data request an intermediary digital signature of the secure data provider stored in the intermediary processing system; and h2-2) applying to the secure data request an identifier of the intermediary data provider stored in the intermediary processing system, thereby generating the enhanced signed secure data request.

Step i) may comprise authenticating the identifier of the intermediary data provider comprised within the enhanced secure data request.

The authenticity of the enhanced secure data request may be verified in step i) only if the identifier of the intermediary data provider is authenticated positively.

Step g) may comprise:

g1) sending a data request for the data associated with the user to the software module installed on the user device and which is associated with the secure data processing provider; and g2) applying by the software module the signed device authentication key stored in the secure hardware module to the data request thereby generating the signed secure data request.

Step g1) may comprise:

g1-1) upon receipt of the data request, the software module requesting the secure data processing provider to send a trigger specific to the user device for the software module of the user device to obtain the signed device authentication key stored in the secure hardware module; and g1-2) upon receipt of the trigger by the software module, sending the data request to the software module with the received trigger to generate the signed secure data request.

The software module may request the trigger from the secure data processing provider via an http request, and the appropriate trigger specific to the user device is transmitted as a web link in response to the software module, wherein the web link is processed by the software module to obtain the signed secure data request.

Step g2) may comprise identifying the user via a secure user device authentication process, and only if the user is identified satisfactorily, applying the digital signature by the secure hardware module to the data request thereby generating the signed secure data request.

Step g2) may comprise encrypting the data request with a private key of the signed device authentication key stored in the secure hardware module.

The device setup request and/or user setup request may be authenticated using a Secure Customer Authentication (SCA) process.

In a further aspect of the invention, there is provided a computer readable medium comprising computer executable instructions executable to perform the aforementioned method.

In a further aspect of the invention, there is provided a user device configured to perform the aforementioned method.

In a further aspect of the invention, there is provided a system comprising processing circuitry configured to perform the aforementioned method.

BRIEF DESCRIPTION OF THE DRAWINGS

Embodiments of the invention are described below, by way of example, with reference to the following drawings, in which:

FIG. 4 is a protocol sequence diagram of a computer-implemented method for enabling installation of a software application according to the invention;

DETAILED DESCRIPTION

Figure 1:
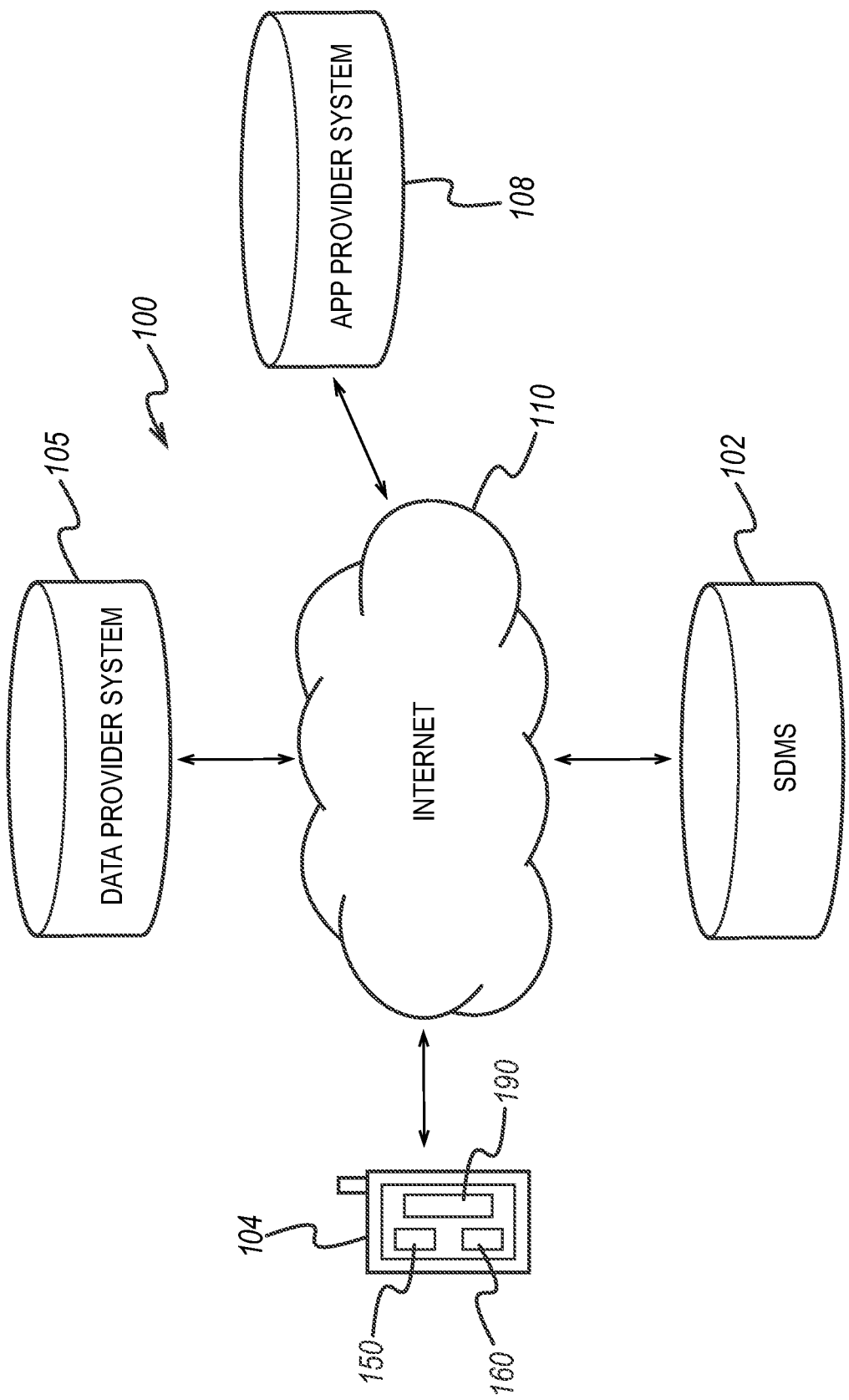
FIG. 1 is a schematic of a system for enabling access to secure user data according to the invention.

Referring to FIG. 1, a system 100 is shown whereby the system 100 is for providing secure access to data associated with a user. The system comprises a secure data management system (SDMS) 102, a user device 104, optionally a third party (intermediary) data processing system 105, and a software application (app) provider system 108.

The SDMS 102 is configured to store data relating to users of the system 100 in a secure manner. Specifically, the SDMS 102 stores data that is associated with the user, and the data may comprise one or more secure data items. Each one of these data items is indicative of private information relating to a user of the SDMS 102 (e.g. the user associated with device 104) and can be processed upon request from the user by the SDMS 102. In one example, each data item comprises financial data relating to the user, such as details that enable the user to make payments or the details of previous financial transactions made by the user.

The following systems and methods are described in the context of managing access to financial data and payments. However, these systems and methods could be used to manage access to any type of secure data for which access by unauthorised third parties is to be securely controlled, managed and restricted.

In the following examples, data stored at the SDMS 102 is referred to as being accessible by a given user, and that the data is associated with the user. For example, the user may have access to an online user account, such as an online banking account, via an account interface. In this scenario, the user may be assigned a unique username and a shared secret (e.g. login information), such as a password, that can be used to access the user account via the account interface. Once the user has accessed the user account, that user is able to access the data via the user account. Therefore, the data is accessible by the user via login information that is unique to the user.

The secure data that is accessible by the user may be accessible via the SDMS 102 itself. The secure data may be accessible by the user only, unless otherwise authorised by user. In other words, the secure data is prevented from being sent to a device or a system that is remote and distinct from the SDMS 102, such as any user device, the app provider system 108 or additional data provider system 105, without the user providing authorisation via their own user device 104 to the SDMS 102 for the data to be sent to such systems. In addition, the user device itself can be associated with the given user such that only requests for data received from the user's associated device for the associated identified user will be processed and such user data returned to the given device. The process of setting up and associating the user device with a user and their secure data at the SDMS 102 is described below.

The system 100 comprises the user device 104 which is operated by the user. The system 100 also comprises an app provider system 108 from which software applications (apps) and software modules providing specific functionality for dedicated services (such as SDMS 102) can be obtained, i.e. downloaded and installed on the user device 104. A given app which is downloaded to the user device 104 may be associated or provided originally by the entity in control of the data processing system 105, and this entity is a different entity to the entity managing and controlling the SDMS 102. However, it is desirable for the app associated with data processing system 105 to be able to obtain, e.g. for storage or display, secure user data from the SDMS 102.

Each one of the SDMS 102, the app provider system 108, the data processing system 105 and the user device 104 are arranged to communicate with one another via a communications network 110. The communications network 110, in this example, is the Internet 110. However, it will be appreciated that any suitable form of communications network 110 could be used, and communication between the devices and systems on the network 110 may be wired and/or wireless using known protocols and standards.

Each one of the SDMS 102, app provider system 108, the user device 104 and the data processing system 105 can be web-enabled and may comprise a display, a user interface, a processor and memory. The devices and systems 102, 104, 105, 108 can be arranged to communicate data between one another via any suitable communications protocol or connection. As explained already, the devices and systems 102, 104, 105, 108 may communicate with one another via a wired and/or a wireless connection.

The user device 104 may be any suitable type of personal computing device, such as a laptop computer, a desktop computer, mobile phone, a web-enabled telephone, such as a smartphone, or a tablet device. The SDMS 102, the data processing system 105 and the app provider system 108 may be any suitable type of computing system or collection of computing systems, such as a server or a collection of servers.

A user application (app) 150 is installable on the user device 150 such that it can be obtained from app provider system 108 and stored in memory of the device for subsequent execution by the user device 150. In addition, a separate software module 160 can be obtained and installed alongside the app 150. The software module 160 is typically provided for and associated with the SDMS 102 and provides software functions for accessing and obtaining the secure user data stored by the SDMS 102. The app 150 may be provided by and associated only with: (i) the DPS 105 and provide functionality for interacting with DPS 105 and obtaining data therefrom; or (ii) the SDMS 102 and provide functionality for accessing the SDMS 102 and obtaining data therefrom via the software module 160. Alternatively, the app 150 may provide functionality for interacting with DPS 105 and obtaining data therefrom, and additionally provide functionality for accessing the SDMS 102 and obtaining data therefrom via the software module 160, once it has been linked to the app 150 after authorised by SDMS 102. The app 150 and software module 160 may be obtained from app provider system 108 together, for example when a request is made to obtain the app 150, the software module 160 may also be installed alongside the app 150 on the user device 104. Alternatively, the software module 160 may be obtained from app provider system 108 and installed separately from the app 150, for example when a user of the app 150 determines that the functionality provided by the software module is required, such as access to the SDMS data, the app 150 may obtain the software module 160 from the app provider system (or other location) and install it automatically.

Figure 2:
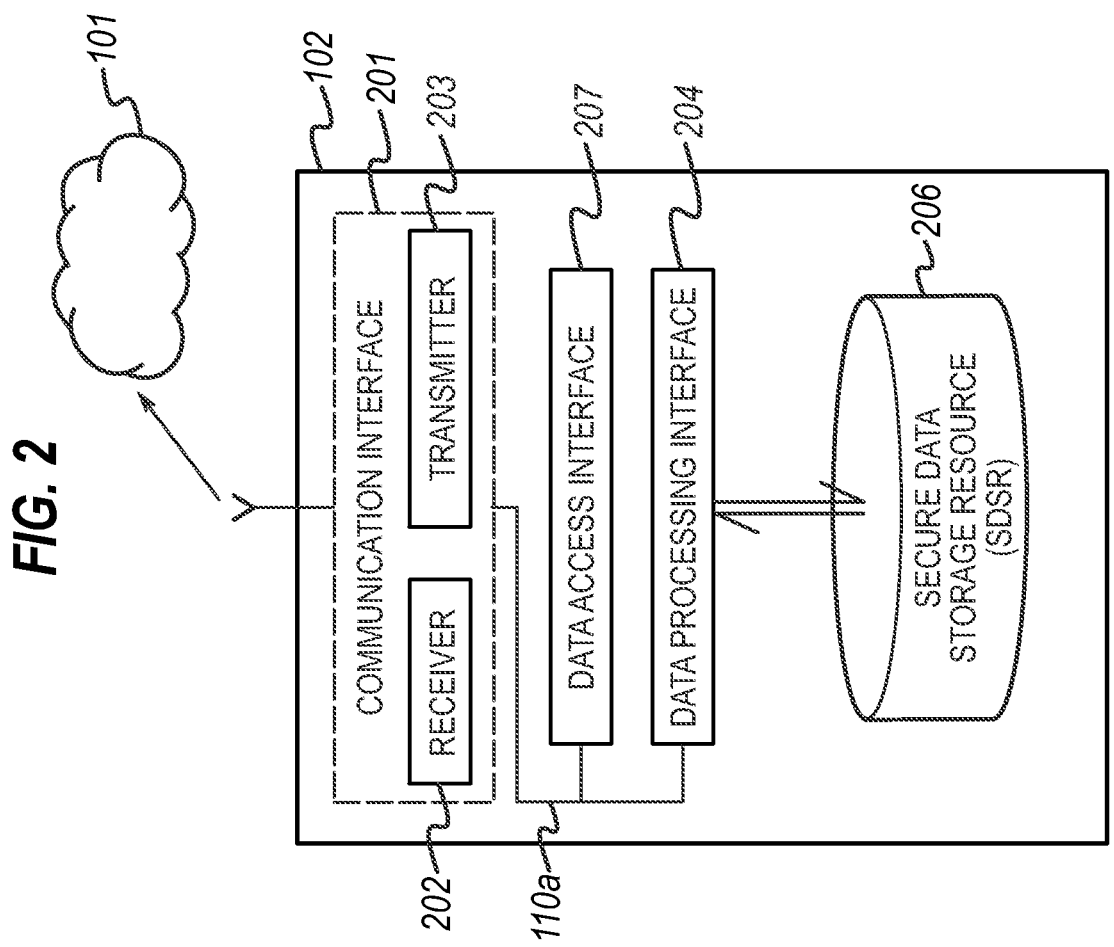
FIG. 2 is a schematic of secure data management system according to the invention.

Referring to FIG. 2, the SDMS 102 provided by and under control of the second entity comprises a communication interface 201 comprising a receiver 202 and a transmitter 203, which may be integrated together as a single transceiver or multiple transceivers (see below) and configured to communicate with the external network 110 (e.g. WAN), and an internal network 110a (e.g. LAN of the second entity). The communication interface 201 is configured to prevent unauthorised access by malicious or unauthorised users/entities to all of some devices on the internal network 110a from the external network 110, for example with the provision of firewall functionality. The SDMS 102 also comprises a data access interface (DAI) 207, e.g. an application program interface (API), which is configured to enable communication of data between the user device 104 and installed app 150 and the secure data stored in the secure data storage resource (SDSR) 206. Also provided within the SDMS 102 is a data processing interface (DPI) 204. The SDSR 206, DPI 204 and DAI 207 may be provided by individual separate subsystems, e.g. on separate standalone or distributed servers, or integrated into a single system on a single server. When provided separately, communication interface 201, SDSR 206, DPI 204 and DAI 207 may communicate with each other across internal network 110a.

Notably, the communication interface 201 may prevent entirely or in part unauthorised access across internal network 110a by the user device 104, first entity, data provider system 105 and/or app provider system 108 to the DPI 204 and SDSR 206, whilst permitting access across internal network 110a to the DAI 207. In this way, for example, the DAI 207 can be configured to provide a common communications interface for access by the data provider system 105 and/or user device 104. This might be to obtain and store secure data stored in SDSR 206 and additionally it might be to initiate data processing on secure data stored in the DSR 206 via instructions transmitted from app 150, via device 104 and communication interface 201 and data access interface 207 to the data processing interface 204. The DPI 204 is configured to act on those instructions and process the secure data in the SDSR 206. The data access interface 207 is configured to process and act on requests for secure data and requests to process secure data to user device 104 and/or data provider system 105 when an authenticated request is received from device 104 or system 105, e.g. requests signed with the appropriate secure public encryption key associated with the user of the user device 104 and authenticated with a corresponding private encryption key stored by the data access interface 207.

Figure 3:
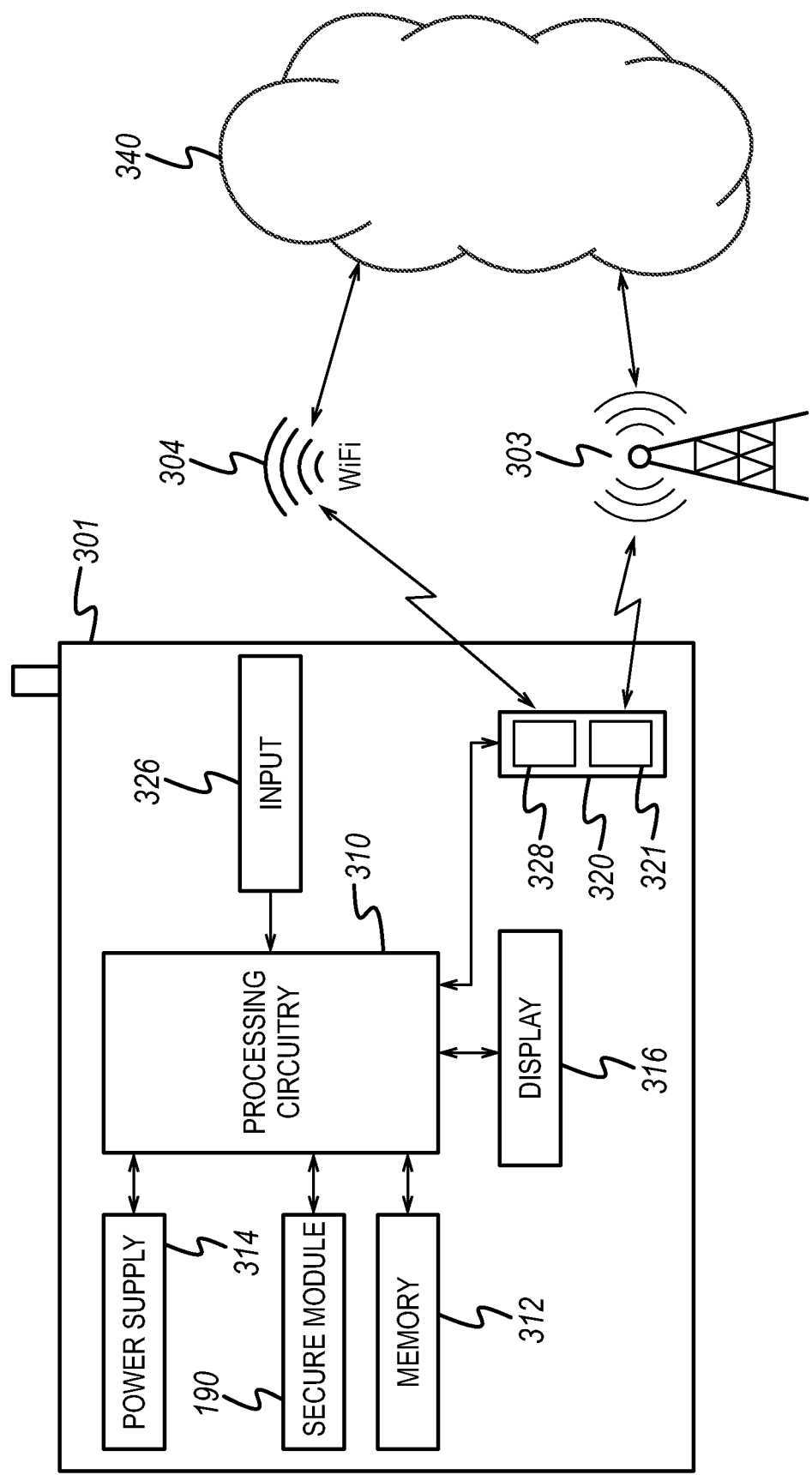
FIG. 3 is a schematic of an electronic device utilised according to the invention.

FIG. 3 shows an exemplary user electronic device 301 according to any of the electronic devices or systems of this disclosure (such as the user device 104, the data processing system 105, the app provider system 108, the SDMS 102). The electronic device 301 comprises processing circuitry 310 (such as a microprocessor) and a memory 312. Electronic device 301 may also comprise one or more of the following subsystems: a power supply 314, a display 316, a communication interface 201, and an input device 326. The electronic device 301 may be implemented as a single or distributed device, for example as a single or distributed server system in the case of systems 105, 108 and 102.

Optionally, in the case of the user device 104, the electronic device 301 comprises a secure storage module 190 which is configured to store device data securely, e.g. in encrypted form, and only release such device data when the legitimate user associated with the device and/or app 150 is authenticated, for example via user biometric input via input device 326 or correct passcode/pass key login made via input 316. The device data stored securely in the secure storage module 190 may comprise one or more software module encryption keys for the app 150, public encryption keys for signing user credentials of the SDMS 102, and/or user credentials for the SDMS 102.

Processing circuitry 310 may control the operation of the electronic device 301 and the connected subsystems to which the processing circuitry is communicatively coupled. Memory 312 may comprise one or more of random access memory (RAM), read only memory (ROM), non-volatile random access memory (NVRAM), flash memory, other volatile memory, and other non-volatile memory.

Display 316 may be communicatively coupled with the processing circuitry 310, which may be configured to cause the display 316 to output images representative of the secure data shared between the entities in the system 100.

The display 316 may comprise a touch sensitive interface, such as a touch screen display. The display 316 may be used to interact with software that runs on the processor 310 of the electronic device 301. The touch sensitive interface permits a user to provide input to the processing circuitry 310 via a discreet touch, touches, or one or more gestures for controlling the operation of the processing circuitry and the functions described herein. It will be appreciated that other forms of input interface may additionally or alternatively be employed for the same purpose, such as the input device 326 which may comprise a keyboard or a mouse at the input device.

The communication interface 201 may be one or more long-range RF transceivers that are configured to operate according to communication standard such as LTE, UMTS, 3G, EDGE, GPRS, GSM, and Wi-Fi. For example, electronic device 301 may comprise a first wireless transceiver 321, such as a cellular transceiver, that is configured to communicate with a cell tower 303 via to a cellular data protocol such as LTE, UMTS, 3G, EDGE, GPRS, or GSM, and a second transceiver 328, such as a Wi-Fi transceiver, that is configured to communicate with a wireless access point 304 via to a Wi-Fi standard such as 802.11 ac/n/g/b/a. In this regard and for the purposes of all embodiments herein concerning a long-range wireless protocol, a long-range wireless protocol may be a protocol which is capable and designed for communication over 5, 10, 20, 30, 40, 50, or 100 m. This is in contrast to short-range wireless protocol mentioned above. The long-range wireless protocol may communicate utilizing higher power than the short-range wireless protocol. The range (e.g. line of sight distance) between the long-range end nodes (electronic device and router or base station) for the long-range wireless protocol may be greater than the range (e.g. line of sight distance)

between the short-range end nodes (e.g. electronic device and wireless beacon). Alternatively or in addition, the communication interface 201 may be a wired network transceiver configured to wirelessly communicate with network 110.

Electronic device 301 may be configured to communicate via the communication interface 201 with a network 110. Network 110 may be a wide area network, such as the Internet, or a local area network. Electronic device 301 may be further configured to communicate via the communication interface 201 and network 110 with one or more systems, such as systems 102, 105 and 108, or other user devices. These may be any one of those described herein.

Application Module Installation and Registration with First Entity

Referring to FIG. 4, a method is depicted as to how a user accesses the app provider system 108 to obtain the app 150 which is then enabled on the device (see FIG. 5) so as to permit access the secure data stored at the SDMS 102 using the user device 104.

In step 41, the user device 104 transmits a request to the app provider system 108 to receive and download a software application (app 150) pertaining to a first (intermediary) entity. The app provider system 108 is configured to store a plurality of different apps associated with multiple different entities.

In step 42, the app provider system 108 transmits the app selected on user device 104 and requested in step 1 to the user device 104. Thus the entire app can be downloaded from app provider system 108. The app 150 is automatically installed onto the device 104 upon receipt.

In step 43, the user of the device 104 causes the app to execute on the device such that a registration/login procedure can be initiated. This procedure identifies the user to the data provider system 105; it is this data provider system 105 which is typically associated with the app 150. Then, in step 44, confirmation of login/registration of user and app 150 is sent by the data provider system 105 to the device 104, such that the device 104 and its associated user, along with app 150 is now linked and associated with the data provider system 105. Accordingly, services and data of the data provider system, e.g. web-enabled data, which may be specific to the user can be transmitted to the user device 104 and displayed within the app 150. Similarly, the user can enter data via the app 150 which is then transmitted and stored within the data provider system 105. This data which is exchanged between the data provider system 105 and app 150 is data pertaining to the first entity. The registration/login procedure with the data provider system 105 may be implemented via strong user/customer authentication (SCA). This authentication based on the use of two or more elements categorised as knowledge (something only the user knows), possession (something only the user possesses) and inherence (something the user is). The elements must be independent from one another, in that the breach of one does not compromise the reliability of the others.

Following or during installation of app 150, either automatically or upon instigation by the user of the app 150, the user device 140 can transmit a request to app provider system (or alternatively the SDMS 102 itself) for the dedicated software module 160 associated with the SDMS 102 to be installed on user device 104 (step 45). The app provider system 108 (or SDMS 102) can then transmit the software module to the user device 104 and install it on device 140.

Once the method of FIG. 4 has been performed and a user, their user device 104 and installed app 150 have been associated with a first entity, it may then become desirable for the user to access secure data of the SDMS 102, which as explained above is under the control of a second entity, which can be entirely distinct and separate to the first entity.

Secure Registration of Device and App with Second Entity

Figure 5:
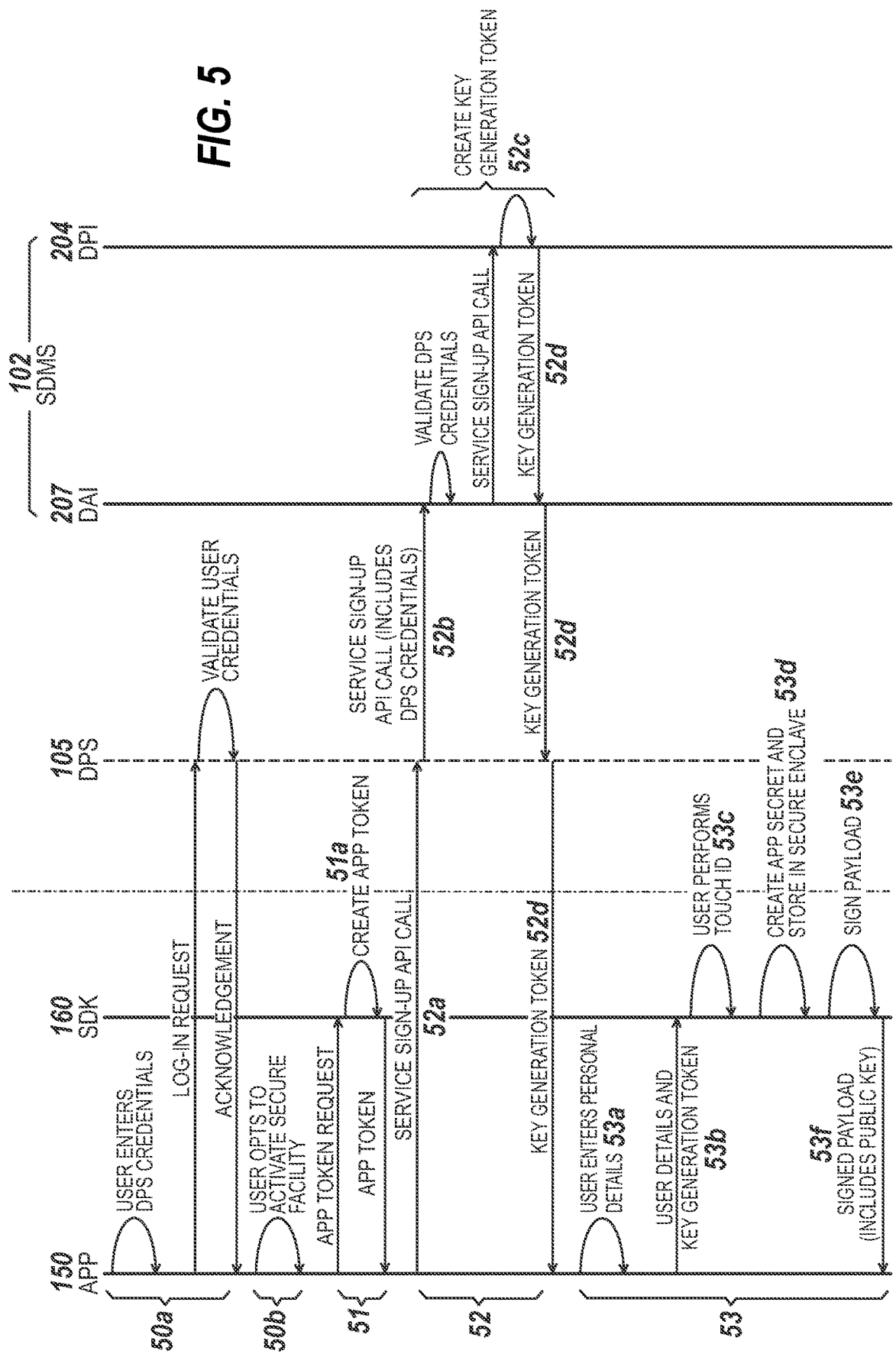
FIG. 5 is a protocol sequence diagram of a computer-implemented method for enabling access to secure user data according to the invention.

Referring to FIG. 5, a method according to the invention is depicted for securing the user device 104 so as to enable a user to have secure data access via the app 150 (optionally associated with the first entity) to the secured user data stored at the SDMS 102 (which is associated with the second entity). This is achieved in conjunction with the software module 160. The software module 160 (e.g. SDK) is pre-installed on the user device 104 and is associated with the SDMS 102 and the second entity. The software module 160 may be installed on the device as one modular component of the app 150 or separately. The software module 160 may be a secure software module comprising one or more unique identifiers of the second entity. The software module may be a software development kit (SDK) of the second entity provided to the device and is configured to provide a number of functions unique to the second entity, for example functions pertaining to the obtaining of secure user data from the SDMS 102 as described below. These functions can only be performed when the instance of the software module 160 installed on the user device 105 has been pre-authorised and registered for a given user with the SDMS 102 via the app 150, and thus the app 150 has been authorised. Each instance of the software module 160 installed on the user device 104 may be unique and the process of installation can include associating its unique instance with a unique device digital signature (private key) unique to both the device on which it is installed and the given user. This private key may be stored within the secure storage module 190 of the user device, and is associated with the SDMS 102 and the user of the user device with corresponding secure user data stored on the SDMS 102.

In step 50a, the app 150 validates user credentials for data provider system 105 to ensure setup of app 150 and access to data provided by system 105. In step 50b, user of app 150 determines to activate access to SDMS 105. In step 51, the app 150 associated with the first entity requests and receives an application token via the software module 160. The application token may be a signed device authentication (public) key which is generated from the private key stored in the secure storage module 190 of the user device when the user associated with the device is authenticated, for example by a secure user authentication process, such as passcode, biometric, touch or facial verification. The private key stored within the secure storage module 190 may be known outside secure storage module 190 only to the SDMS 102 which can accordingly verify the signed device authentication (public) key to check that requests from the app 150 are being made by a user device which has been validly authenticated with the given user having corresponding secure user data stored on the SDMS 102 (step 51a).

In step 52, a device setup request is transmitted from the user device 105 to the SDMS 102. The device setup request comprises the application token. In step 52c, the authenticity of the device setup request is validated at the SDMS 102. Since the software module is associated with the SDMS 102 and the application token is generated from app 150, whereby the application token has been generated based on the specific software module and corresponding app, processing of the application token by the SDMS 102 can this verify whether the application token has been generated based on a valid app and software module relationship, and thus whether the request for access to the SDMS is itself from a valid source, e.g. whether it is from a software module associated with the SDMS 102. If the authenticity of the device setup request is verified, then in step 52*d*, a further device encryption key can be generated at the SDMS 102 and this is further transmitted in step 52*d* to the user device 104 and stored within the user device 104, for example in secure storage module 190.

The device encryption key is a public key for the device and is generated by SDMS 102 for storage in the device 104. The corresponding private key to this public key can be stored only in the SDMS 102.

In an optional embodiment of the invention, in step 52*a*, the device setup request is received by the data provider system 105 associated with the first entity. In step 52*b*, the data provider system 105 generates an enhanced device setup request which includes the device setup request and additional signed credentials of the data provider system 105. In step 52*c*, the enhanced device setup request is transmitted to the SDMS 102.

Subsequently in step 53, a device signing request is sent to the software module 160 in the user device 104 with user entering account credentials for SDMS (step 53*a*) and these are passed to module 160 (step 53*b*) to generate public key with, for example user identification data, as payload. On receipt of the device signing request in step 53*c*, a user of the user device 104 is securely authenticated by the user device 104 with a secure user authentication process. Such a process may be a biometric, passcode or password authentication of the user by the user device 104.

Only if the user of the device is positively authenticated by the user device 104 (step 53*c*), in step 53*d* private secure data provider encryption key is generated based on the specific app 150 and stored in secure module 190 (step 53*d*). The payload is signed with private key (step 53*e*) and associated with public key corresponding to private key (53*f*) which is a signed device authentication (public) key to be utilised by app 150 for communication with SDMS 102.

In one embodiment, the process in step 53 may be instigated by app 150 calling a trigger based web frame at the SDMS 102. This trigger based web frame contains one or more trigger links, e.g. custom URLs (assuming the device signing request is verified satisfactorily by SDMS 102), which are transmitted back to the device 104 and app 150, Device 104 is capable of interpreting the one or more custom links to cause software module 160 to perform steps 53*d* and 53*e*. The device signing request sent in step 53*b*, for example containing the user identification data, is received by SDMS 102 and placed into the one or more trigger links in the web frame which is then sent back to the device 104. The one or more trigger links are picked up by device 104 and sent to software module 160 to cause the software module to generate the private key and associated signed device authentication (public) key as outlined above.

User Setup

Figure 6:
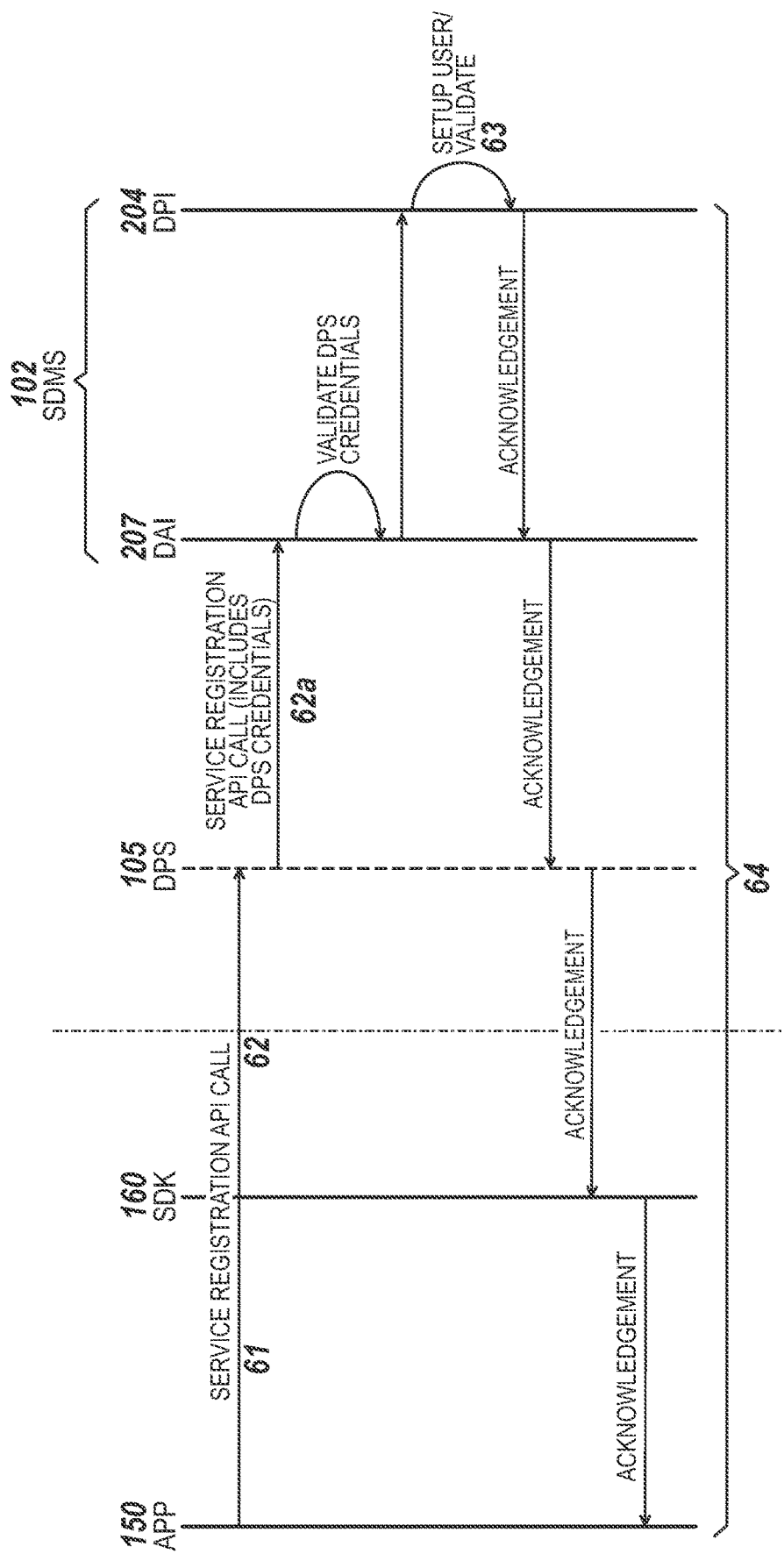
FIG. 6 is a protocol sequence diagram of a computer-implemented method for authenticating a software application according to the invention.

Referring to FIG. 6, a method according to the invention is depicted for securely authenticating a user and the app 150 with the second entity and SDMS 102 utilising the signed device authentication key. In step 61, a user setup request is generated for the SDMS 102 within the app 150 and signed/encrypted with signed device authentication key. In step 62, the signed/encrypted user setup request is transmitted from the user device to the SDMS 102. In step 63, the authenticity of the user setup request is verified at the SDMS 102 by checking the validity of the signing by the device authentication key obtained from the user via the app 150 or attempting decryption of the user setup request, and additionally checking the user credentials for the user which are stored within the SDMS 102. In step 64, if the authenticity of the user setup request can be validly verified by the SDMS 102, a secure data storage profile for the user is configured at the secure data provider. Since the SDMS 102 is associated with software module 160, it is configured to apply the associated secure decryption/signing check of the user setup request so as to determine the validity of the user setup request for the app 150.

For step 63, the user and the user device 104 may be further authenticated by transmitting a mobile verification code (MVC), which is a code of character and/or digits sent by a separate device messaging service (e.g. SMS) to the user device 104. The SDMS 102 looks up the user device identifier (e.g. mobile number) of the user based on the received user credentials. This MVC is then entered by the user into the app 150 which transmits the code back to the SDMS 102 so that it can be checked against the MVC previously transmitted to see whether this received MVC was in fact the MVC previously transmitted. If so, the user and/or the device 104 can be positively verified. The user authentication procedure with the SDMS 102 may be implemented via strong user/customer authentication (SCA). This authentication can be based on the use of two or more elements categorised as knowledge (something only the user knows), possession (something only the user possesses) and inherence (something the user is), as for example provided for under PSD2 (EU Payments Services Directive 2, 2015/2366). The elements must be independent from one another, in that the breach of one does not compromise the reliability of the others. For example, an alternative step 63 under PSD2 may comprise authenticating the user via a dedicated authentication application associated with and provided by the secure data provider, and installed on the user device and associated with the user being authenticated. The SDMS 102 looks up the corresponding user device identifier of the user based on the received user credentials, and transmits an authentication message to the authentication application. The authentication application requests that the user authenticate him/herself, for example via biometric login, e.g. touch or facial recognition. Upon verified authentication of the user, the user device transmits a positive authentication message to SDMS 102, such that the user and/or the device 104 can be positively verified.

In addition or alternatively, for step 63, the user may be further authenticated by modifying the secure user data for the user stored at the SDMS 102. The user can then separately login directly to the SDMS 102 by a separate mechanism and identify the change in their secure user data. Once identified, the modified user data can be input into the app 150 by the user and transmitted to the SDMS 102 which verifies whether the modified data was in fact the data which was modified by the SDMS 102. If so, the user is positively identified.

In a further optional embodiment of the invention, the data provider system 105 can be utilised generate an enhanced user setup request. The first entity data provider system 105 can receive the user setup request prior to it being transmitted to the SDMS 102. Since the data provider system 105 stores user credentials and additional user data for the user which has previously registered itself with the first entity, the data provider system can supplement the user setup request received with additional user data required for setup by the SDMS 102, without the user having to enter such information into the app 150.

Moreover, if the first entity and data provider system 105 is trusted by the second entity and SDMS 102 (as will often be the case), then the user setup request can be further validated by the data provider system 105 prior to being transmitted to the SDMS 102. This can enhance the security and verification of the user. This can be achieved by generating signed first entity credentials in the data provider system 105 and including these signed first entity credentials within or alongside the user setup request which is then passed to the SDMS 102. The SDMS 102 can additionally check the legitimacy of the signed first entity credentials, and if determined to be legitimate, then the user setup process at the SDMS 102 can continue. If not, the process can be terminated.

Data Provision to Device

Figure 7:
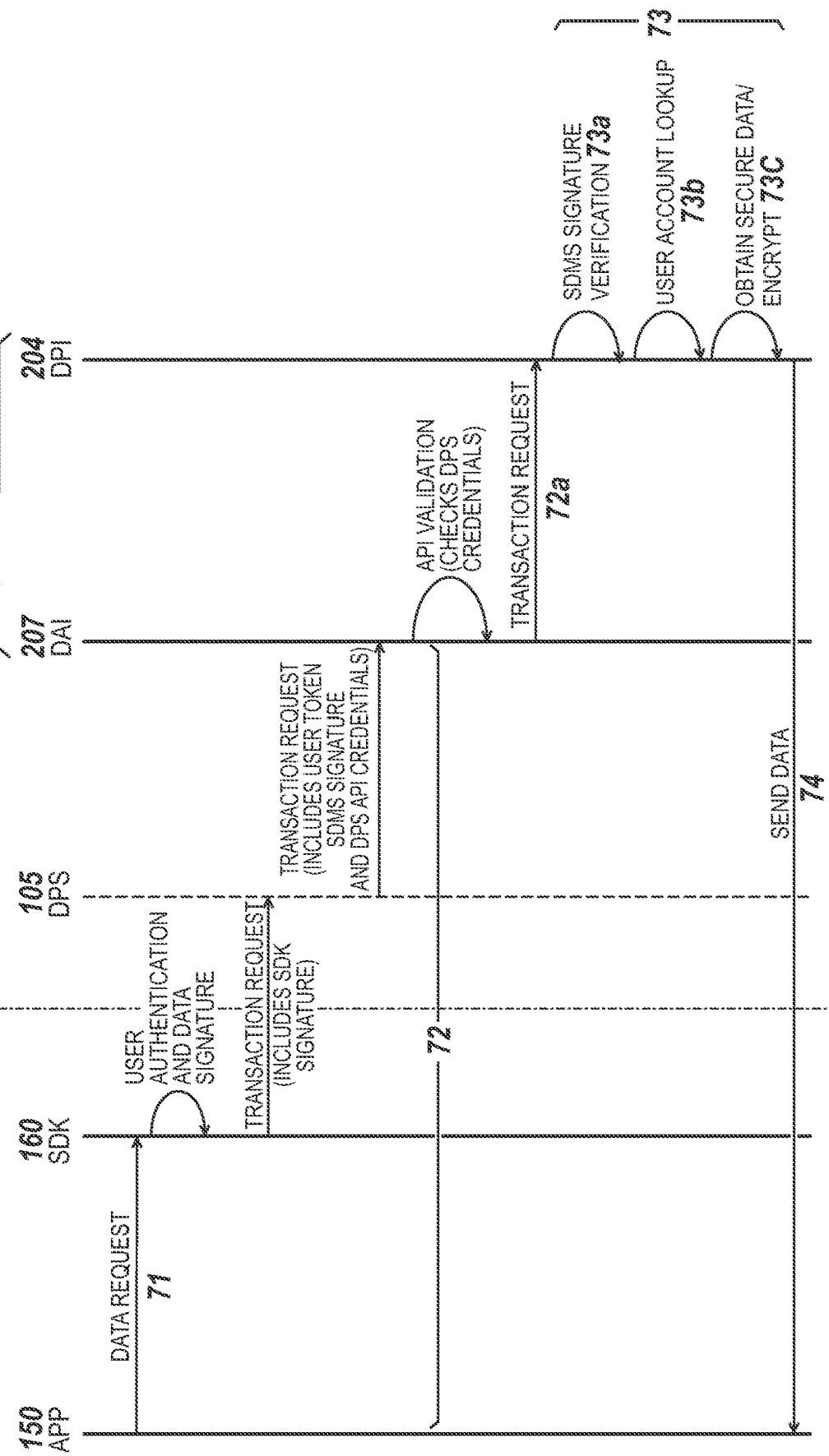
FIG. 7 is a protocol sequence diagram of a computer-implemented method for providing secure user data to a user device according to the invention.

Referring to FIG. 7, a method is depicted for providing user data from the SDMS 102 to the user device 104. This method can be performed only once the user device 104 and user associated with the user data have been authenticated with the SDMS 102. In step 71, when a user instigates a request for their secure data via the app 150, a secure data request is generated at the user device and in step 72 this is transmitted to the SDMS 102.

To do this, the app 150 upon instigation by the user requesting the data and possible verification of the user, transmits a request for the device digital signature (signed device authentication (public) key) to the software module 160 which then requests the signed device authentication (public) key (corresponding to the private key stored in the secure storage 190). During this process, the user is identified with the secure storage 190 via a secure user device authentication process (e.g. via passcode, or other biometric recognition), and only if the user is identified satisfactorily, the software module 160 obtains the device digital signature (signed device authentication (public) key) from the secure storage 190 and applies it to the data request thereby generating the secure data request. This request may also contain a user identifier.

In step 73, the authenticity of the secure data request is verified by the SDMS 102, and if the authenticity of the secure data request is verified, in step 74 data identified by the secure data request is obtained from storage by the SDMS 102 and transmitted to the user device 104. In addition, if the authenticity of the secure data request is not verified a response is transmitted to the user device 104 which indicates that the secure data request cannot be verified by the SDMS 102.

In step 72, the signed device authentication (public) key obtained by the software module 160 from the secure storage 190 is transmitted in the secure data request. The authenticity of the signed device authentication (public) key can then verified by the SDMS 102 only if the device digital signature of the software module is verified. The secure data request is verified in step 73 by checking whether the device digital signature (signed device authentication (public) key) can be authenticated against the private key for the user associated with the received user identifier which is stored at the SDMS 102. If so, it can be confirmed that the user device sending the secure data request is the device associated with the user.

Optionally, in step 72, the data provider system 105 may receive the secure data request from the user device 104 and thereby generate an enhanced secure data request comprising the secure data request. The provider system 105 applies a digital signature of the data provider to the secure data request to generate the enhanced data request. Once generated, this enhanced secure data request can then be transmitted to the SDMS 102. Subsequently, the enhanced data request containing the digital signature of the data provider can additionally be authenticated by the SDMS 102 and if verified, step 74 then proceeds. This permits a further level of security for data providers which are trusted by the secure data provider of the SDMS 102.

The term "comprising" encompasses "including" as well as "consisting" e.g. a composition "comprising" X may consist exclusively of X or may include something additional e.g. X+Y.

Unless otherwise indicated each embodiment as described herein may be combined with another embodiment as described herein.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc., and do not include propagated signals. The software can be suitable for execution on a parallel processor or a serial processor such that the method steps may be carried out in any suitable order, or simultaneously. This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

It will be appreciated that the modules described herein may be implemented in hardware or in software. Furthermore, the modules may be implemented at various locations throughout the system.

Those skilled in the art will realise that storage devices utilised to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realise that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought. Any of the module described above may be implemented in hardware or software.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the scope of this invention.

Embodiments of the Invention

Device/App/User Registration

1. A computer-implemented method for securing a user device for receiving secure user data associated with a user of the user device from a secure data processing of a secure data processing provider, the method comprising:
   a) requesting and receiving by a user application executing on the user device a signed device authentication key via a software module installed on the user device;
   b) transmitting by the user application a device setup request from the user device to the secure data processing system, the device setup request comprising the signed device authentication key,
      wherein the software module is associated with the secure data processing provider and the signed device authentication key is generated uniquely for the user device upon request by the user application, wherein the software module is installed on the user device as a software module distinct from the user application.

2. The computer-implemented method of embodiment 1, further comprising:
   c) verifying the authenticity of the device setup request at the secure data processing system with the signed device authentication key;
   d) only if the authenticity of the device setup request is verified according to step c), then associating the user device identified according to the device setup request with the secure user data stored at the secure data processing system.

3. The computer-implemented method of embodiment 1 or embodiment 2, wherein step b) comprises:
   b1) receiving at an intermediary processing system of an intermediary data provider, the device setup request; and
   b2) generating at the intermediary processing system an enhanced device setup request comprising the device setup request; and
   b3) transmitting the enhanced device setup request to the secure data processing system as the device setup request.

4. The computer-implemented method of any one of the preceding embodiments, wherein step a) comprises:
   a1) sending a device signing request to the software module;
   a2) on receipt of the device signing request, securely authenticating the user of the user device with a secure user authentication process of the user device;
   a3) only if the user of the device is positively authenticated, generating via the software module the signed device authentication key comprising a public key corresponding to a private key of the secure data processing system stored in a secure hardware module of the user device.

5. The computer-implemented method of any one of the preceding embodiments, further comprising:
   e) generating in the user application a user setup request for the secure data processing provider;
   f) transmitting the user setup request from the user device to the secure data processing provider along with the signed device authentication key for the user device;
   g) verifying the authenticity of the user setup request at the secure data processing system; and
   h) only if the authenticity of the user setup request is verified at the secure data processing system, setting up a secure data storage profile for the user at the secure data provider and associating the secure data storage profile with the user device from which the signed device authentication key was received.

6. The computer-implemented method of embodiment 5, wherein step h) further comprises one or more of:
   h1) validating the user via a mobile verification code authentication process; and
   h2) validating a third party user account of the user via an account verification code (AVC) authentication process.

7. The computer-implemented method of embodiment 5 or embodiment 6, wherein step f) comprises:
   f1) receiving the user setup request from the user device at an intermediary processing system of an intermediary data provider;
   f2) generating at the intermediary processing system an enhanced user setup request comprising the user setup request;
   f3) transmitting the enhanced user setup request from the intermediary processing system to the secure data processing system as the user setup request.

8. The computer-implemented method of embodiment 7, wherein step f2) comprises:
   f2-1) generating signed intermediary credentials of the intermediary processing system; and
   f2-2) generating the enhanced user setup request comprising the user setup request received from the user device and signed intermediary credentials.

9. The computer-implemented method of embodiment 7 or embodiment 8, wherein step f2) comprises:
   f2-3) generating the enhanced user setup request comprising the user setup request received from the user device and additional data stored at the intermediary processing system, wherein the additional data is associated with to the user and/or user device.

10. The computer-implemented method of any one of the preceding embodiments, wherein the signed device authentication key is unique to the specific instance of the software module stored on the user device.

11. The computer-implemented method of any of the preceding embodiments involving embodiment 2, wherein step d) further comprises:
    d1) generating, at the secure data processing system, a device encryption key; and
    d2) transmitting the device encryption key to the user device and storing the device encryption key within the user device.

12. The computer-implemented method of embodiment 11, wherein the device encryption key is a public key for the device and is generated by the secure data processing system for storage in the device, wherein a corresponding private key to the public key is stored only in the secure data processing system.

Data Provision to Device

13. A computer-implemented method for controlling access to data associated with a user securely to the user device of any one of the preceding embodiments, the data stored in the secure data processing system, the method comprising:
   g) generating at the user device via the software application a signed secure data request for the data associated with the user;
   h) transmitting the secure data request from the user device to the secure data processing system;
   i) verifying the authenticity of the secure data request at the secure data processing system;
   j) if the authenticity of the secure data request is verified according to step i):
      j1) obtaining, at the secure data processing system, user data requested with the secure data request; and
      j2) transmitting the data to the user device; or
   k) if the authenticity of the secure data request is not verified according to step i) not transmitting to the user device any of the secure data requested with the secure data request.

14. The computer-implemented method of embodiment 13, wherein the signed secure data request comprises the signed device authentication key and step i) comprises verifying at the secure data processing system the signed device authentication key comprised within the secure data request with a corresponding private authentication key of the software module associated with the user device and stored at the secure data processing system.

15. The computer-implemented method of embodiment 14, wherein the secure data request comprises a user identifier and step i) comprises identifying a private authentication key corresponding to the software module for the user device of the user identified by the user identifier, and verifying whether the private authentication key corresponds to the signed device authentication key comprised within the secure data request.

16. The computer-implemented method of any one of embodiments 13 to 15 wherein step h) comprises:
   h1) transmitting the signed secure data request from the user device to an intermediary processing system;
   h2) generating at the intermediary processing system an enhanced signed secure data request comprising the secure data request; and
   h3) transmitting the enhanced signed secure data request from the intermediary processing system to the secure data processing system as the secure data request.

17. The computer-implemented method of embodiment 16, wherein step h2) comprises one or more of:
   h2-1) applying to the signed secure data request an intermediary digital signature of the secure data provider stored in the intermediary processing system; and
   h2-2) applying to the secure data request an identifier of the intermediary data provider stored in the intermediary processing system,
   thereby generating the enhanced signed secure data request.

18. The computer-implemented method of embodiment 17, wherein step i) comprises authenticating the identifier of the intermediary data provider comprised within the enhanced secure data request.

19. The computer-implemented method of embodiment 18, wherein the authenticity of the enhanced secure data request is verified in step i) only if the identifier of the intermediary data provider is authenticated positively.

20. The computer-implemented method of any one of embodiments 13 to 19, wherein step g) comprises:
   g1) sending a data request for the data associated with the user to the software module installed on the user device and which is associated with the secure data processing provider; and
   g2) applying by the software module the signed device authentication key stored in the secure hardware module to the data request thereby generating the signed secure data request.

21. The computer-implemented method of embodiment 20, wherein step g1) comprises:
   g1-1) upon receipt of the data request, the software module requesting the secure data processing provider to send a trigger specific to the user device for the software module of the user device to obtain the signed device authentication key stored in the secure hardware module; and
   g1-2) upon receipt of the trigger by the software module, sending the data request to the software module with the received trigger to generate the signed secure data request.

22. The computer-implemented method of embodiment 21, wherein the software module requests the trigger from the secure data processing provider via an http request, and the appropriate trigger specific to the user device is transmitted as a web link in response to the software module, wherein the web link is processed by the software module to obtain the signed secure data request.

23. The computer-implemented method of any one of embodiments 20 to 22, wherein step g2) comprises identifying the user via a secure user device authentication process, and only if the user is identified satisfactorily, applying the digital signature by the secure hardware module to the data request thereby generating the signed secure data request.

24. The computer-implemented method of embodiment 23, wherein step g2) comprises encrypting the data request with a private key of the signed device authentication key stored in the secure hardware module.

25. The computer-implemented method of any one of the preceding embodiments, wherein the device setup request and/or user setup request is authenticated using a Secure Customer Authentication (SCA) process.

26. A computer readable medium comprising computer executable instructions executable to perform the method of any one of the preceding embodiments.

27. A user device configured to perform the method of embodiment 1.

28. A system comprising processing circuitry configured to perform the method of any one of the preceding embodiments.

What is claimed:

1. A computer-implemented method for securing a user device for receiving secure user data associated with a user of the user device from a secure data processing system of a secure data processing provider, the method comprising:
   a) requesting and receiving by a user application executing on the user device a signed device authentication key via a software module installed on the user device;
   b) transmitting by the user application a device setup request from the user device to the secure data processing system, the device setup request comprising the signed device authentication key;

c) verifying the authenticity of the device setup request at the secure data processing system with the signed device authentication key; and d) only if the authenticity of the device setup request is verified according to step c), then associating the user device identified according to the device setup request with the secure user data stored at the secure data processing system, wherein the software module is associated with the secure data processing provider and the signed device authentication key is generated uniquely for the user device upon request by the user application, wherein the software module is installed on the user device as a software module distinct from the user application, wherein step a) comprises:
  a1) sending a device signing request to the software module;
  a2) on receipt of the device signing request by the software module, securely authenticating the user of the user device with a secure user authentication process of the user device;
  a3) only if the user of the device is positively authenticated in step a2), generating via the software module the signed device authentication key comprising a public key corresponding to a private key of the secure data processing system, the private key being stored in a secure hardware module of the user device.

2. The computer-implemented method of claim 1, wherein the signed device authentication key is unique to the specific instance of the software module stored on the user device.

3. The computer-implemented method of claim 1, wherein the device setup request and/or user setup request is authenticated using a Secure Customer Authentication (SCA) process.

4. A non-transitory computer readable medium comprising computer executable instructions executable to perform the method of claim 1.

5. A user device configured to perform the method of claim 1.

6. A system comprising processing circuitry configured to perform the method of claim 1.

7. The computer-implemented method of claim 1, further comprising:
  c) generating in the user application a user setup request for the secure data processing provider;
  d) transmitting the user setup request from the user device to the secure data processing provider along with the signed device authentication key for the user device;
  e) verifying the authenticity of the user setup request at the secure data processing system; and
  f) only if the authenticity of the user setup request is verified at the secure data processing system, setting up a secure data storage profile for the user at the secure data provider and associating the secure data storage profile with the user device from which the signed device authentication key was received.

8. The computer-implemented method of claim 7, wherein step h) further comprises one or more of:
  h1) validating the user via a mobile verification code authentication process; and
  h2) validating a third party user account of the user via an account verification code (AVC) authentication process.

9. A computer-implemented method for controlling access to data associated with a user securely to the user device of claim 1, the data stored in the secure data processing system, the method comprising:
  i) generating at the user device via the software application a signed secure data request for the data associated with the user;
  j) transmitting the secure data request from the user device to the secure data processing system;
  k) verifying the authenticity of the secure data request at the secure data processing system;
  l) if the authenticity of the secure data request is verified according to step k):
    l1) obtaining, at the secure data processing system, user data requested with the secure data request; and
    l2) transmitting the data to the user device; or
  m) if the authenticity of the secure data request is not verified according to step i) not transmitting to the user device any of the secure data requested with the secure data request.

10. The computer-implemented method of claim 9, wherein the signed secure data request comprises the signed device authentication key and step k) comprises verifying at the secure data processing system the signed device authentication key comprised within the secure data request with a corresponding private authentication key of the software module associated with the user device and stored at the secure data processing system.

11. The computer-implemented method of claim 10, wherein the secure data request comprises a user identifier and step k) comprises identifying a private authentication key corresponding to the software module for the user device of the user identified by the user identifier, and verifying whether the private authentication key corresponds to the signed device authentication key comprised within the secure data request.

12. The computer-implemented method of claim 9, wherein step i) comprises:
  i1) sending a data request for the data associated with the user to the software module installed on the user device and which is associated with the secure data processing provider; and
  i2) applying by the software module the signed device authentication key stored in the secure hardware module to the data request thereby generating the signed secure data request.

13. The computer-implemented method of claim 12, wherein step i1) comprises:
  i1-1) upon receipt of the data request, the software module requesting the secure data processing provider to send a trigger specific to the user device for the software module of the user device to obtain the signed device authentication key stored in the secure hardware module; and
  i1-2) upon receipt of the trigger by the software module, sending the data request to the software module with the received trigger to generate the signed secure data request.

14. The computer-implemented method of claim 13, wherein the software module requests the trigger from the secure data processing provider via an http request, and the appropriate trigger specific to the user device is transmitted as a web link in response to the software module, wherein the web link is processed by the software module to obtain the signed secure data request.

15. The computer-implemented method of claim 12, wherein step i2) comprises identifying the user via a secure user device authentication process, and only if the user is identified satisfactorily, applying the digital signature by the secure hardware module to the data request thereby generating the signed secure data request.

16. The computer-implemented method of claim 15, wherein step i2) comprises encrypting the data request with a private key of the signed device authentication key stored in the secure hardware module.

* * * * *